Dec. 21, 1965   R. D. BULLARD   3,225,344
MEASURING DEVICE

Filed Jan. 11, 1960   3 Sheets-Sheet 1

INVENTOR.
Robinson Bullard

Dec. 21, 1965   R. D. BULLARD   3,225,344
MEASURING DEVICE

Filed Jan. 11, 1960

INVENTOR.
Robinson D Bullard

Dec. 21, 1965  R. D. BULLARD  3,225,344
MEASURING DEVICE
Filed Jan. 11, 1960  3 Sheets-Sheet 3

INVENTOR.
Robinson D. Bullard

United States Patent Office 3,225,344
Patented Dec. 21, 1965

3,225,344
MEASURING DEVICE
Robinson D. Bullard, Springfield, Vt.
(Perkinsville Post Office, Weathersfield, Vt.)
Filed Jan. 11, 1960, Ser. No. 1,702
12 Claims. (Cl. 340—347)

The present invention relates to accurate measuring devices, and particularly to a new and improved analog to digital system for determining, decimally, positions in space of a linearly movable member.

An object of this invention is to provide apparatus for accurately determining, decimally, positions in space of a linearly movable member.

Another object of this invention is to provide an analog to digital system involving no error correcting means.

Another object of this invention is to provide such an analog to digital system in which linear motion of a member is converted to substantially inertialess rotary movement of a code wheel, one revolution of which, or a part thereof, may represent a discrete movement of said linearly movable member.

Another object of the invention is to provide such an analog to digital system in which a rotatable code wheel cooperates with light-sensitive means for operating numerical indicating means arranged in digital form.

Another object of the invention is to provide such an analog to digital system in which a code disc is provided with plural groups of plural coded zones thereon in which each group represents a significant decimal place and in which ten output circuits are controlled by each group of zones.

Another object of the invention is to provide such an analog to digital system in which the coded disc is combined with coincidence circuitry so that upon the energization of certain discrete output circuits of the ten circuits for each group of zones, and depending upon the direction of rotation of the code disc, other means is energized.

Another object of the invention is to provide such an analog to digital system in which a single coded disc can actuate converting and coincidence circuitry for any desired number of digital places.

In one aspect of the invention, a linearly movable member may support a cylindrical wheel in frictional contact with a flat stationary surface. The wheel may have a diameter such that it makes an exact rotary movement for each incremental linear movement of the movable member. A coded disc may be fixed to the wheel and the two may be mounted in anti-friction bearings in a manner to be substantially inertialess. The code applied to the disc may be any one of many, and may, by way of example only, include a plurality of concentric bands. These bands may comprise a plurality of groups of zones. There may be a group of zones for each significant digit on the righthand side of the decimal point of the number representing an inch of linear travel of the movable member. There may be a plurality of zones or bands in each group, and in the embodiment disclosed, there will be described a coded disc having three groups of four zones or bands each, totaling twelve bands or zones.

Each zone or band may include alternate opaque and transparent areas of predetermined dimensions such that the first group of four zones may provide five thousand separate parts. For example, the outermost zone or band may include one thousand opaque areas alternating with one thousand transparent areas; the next three successive inner bands or zones may each include five hundred opaque areas alternating with five hundred transparent areas. There are, therefore, a total of five thousand opaque and transparent areas within the outermost group of four zones or bands. Accordingly, if the coded disc makes one revolution while the movable member linearly moves through five inches, then each inch can be divided into one thousand parts by the outermost four zones or bands comprising the first group of zones. This first group of zones may be employed to indicate the least significant digit of the measurement to be indicated.

The second group of zones or bands may include the next inwardly succeeding four bands on the code disc and they may be employed to indicate the next significant digit, which in the embodiment disclosed is ten times larger than the least significant digit. Accordingly, this second group of four zones may include a total of five hundred instead of five thousand opaque and transparent areas. Consequently, the areas in group two may be ten times as large as those for group one. In the same manner, the third group of four zones or bands on the coded disc may include the next inwardly succeeding four bands, and they may be employed to indicate the most significant digit. In the embodiment disclosed, this digit is ten times as large as the second and one hundred times as large as the least significant digit. Accordingly, this third group of four zones may include a total of fifty opaque and transparent areas instead of the five thousand of group one and the five hundred for group two.

In another aspect of the invention, a bracket may be mounted in cooperating position with the code disc such that it may support in a radial line, a separate photo-electric cell in alignment with each of the twelve zones or bands on the code disc. A radially arranged opaque plate may be located between the code disc and the radially aligned photo cells, and it may include a fine, straight-line scratch radially disposed relatively to the code disc and aligned with the radially arranged photo cells. A light source may be provided on the side of the code disc opposite that of the photo cells, and it may be arranged so that the light therefrom passes through the various bands of the code disc and such that the portion passing through each band affects only the corresponding photo cell.

In still another aspect of the invention, there may be provided an amplifying means for each zone of each group of bands, and a corresponding converting diode matrix for each group of four zones each. There also may be ten output circuits from each diode matrix, and they may be connected to the ten pins of an "Inditron" tube such that when the appropriate pin is energized, the corresponding numeral between "0" and "9" will be illuminated. There will, therefore, be three such "Inditron" tubes in the embodiment disclosed, one for each significant digit on the righthand side of the decimal of the number indicating the decimal position of the movable member along its path of travel.

In still another aspect of the invention, directionally sensitive, coincidence circuitry may be provided for operating an additional "Inditron" tube having any desired number of cathodes for representing any desired number of digits to the left of the decimal point of the number indicating the decimal position of the movable member along its path of movement.

The above, other objects and novel features of the invention will become apparent from the following specification and accompanying drawings which are merely exemplary.

Figure 1:
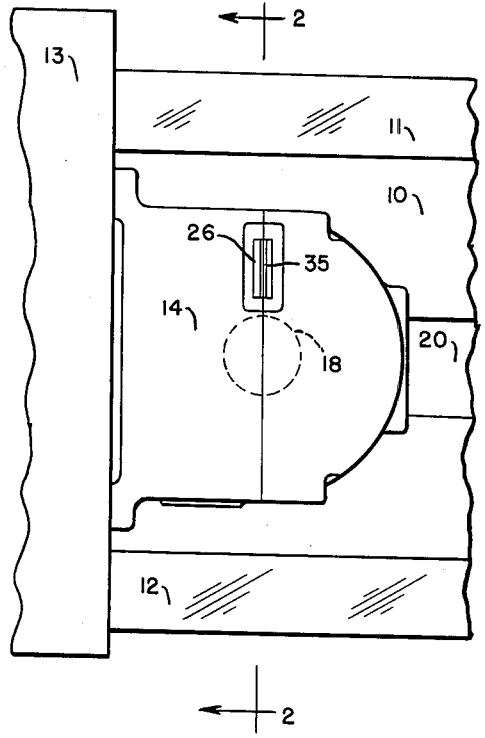
FIG. 1 is a front elevational view of part of a machine tool to which the principles of the invention have been applied.

Referring to the drawings, and particularly to FIG. 1, the principles of the invention are shown as applied to a machine tool including a cross rail 10 having parallel spaced ways 11 and 12. A saddle 13 may be mounted on the cross rail 10 for movement in either direction along the ways 11 and 12 by any power operated means such as hydraulic or otherwise, as is well known. The saddle 13 may have fixed to it a housing 14 for movement therewith.

Figure 2:
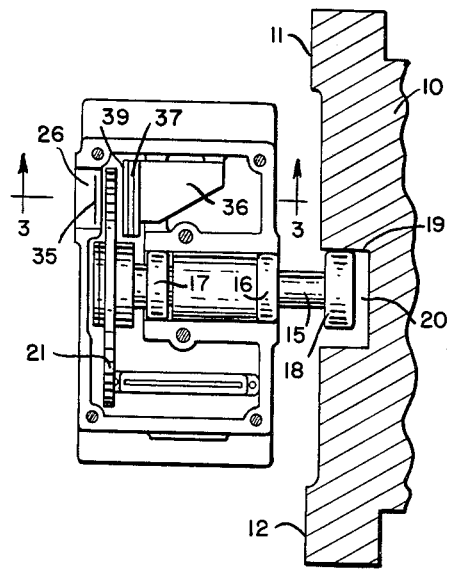
FIG. 2 is a sectional elevational view taken substantially along line 2—2 of FIG. 1.

Referring to FIG. 2, the housing may support a shaft 15 within anti-friction bearings 16 and 17 for substantially inertialess rotation. The one end of shaft 15 may have a wheel 18 fixed to it which is held in engagement with a flat surface 19 of a groove 20 formed in the cross rail 10 and parallel with ways 11 and 12. In the embodiment disclosed, the diameter of wheel 18 is such that movement of saddle throughout a distance of exactly five inches will cause an exact 360° revolution of wheel 18.

A code disc 21 may be fixed to shaft 15 at its end opposite that to which wheel 18 is fixed and in such fashion that it rotates accurately in a single plane. Although different code patterns may be employed on the code disc 21, in the embodiment disclosed, three groups of four zones each are employed. Each group of these zones may be employed to represent a digit to the right of the decimal. Thus, in the embodiment disclosed, three significant digits to the right of the decimal will be disclosed although more may be provided by adding additional groups of zones for each significant place required.

Figure 4:
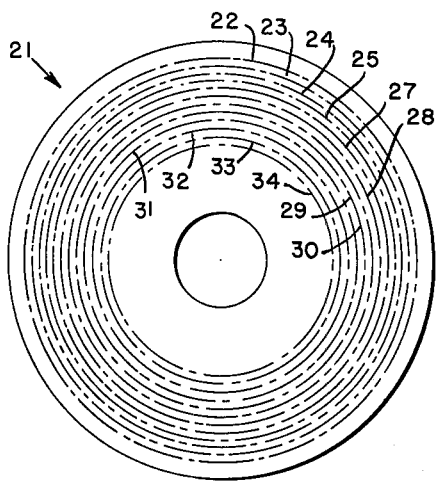
FIG. 4 is a plan view of the code disc.
Figure 5:
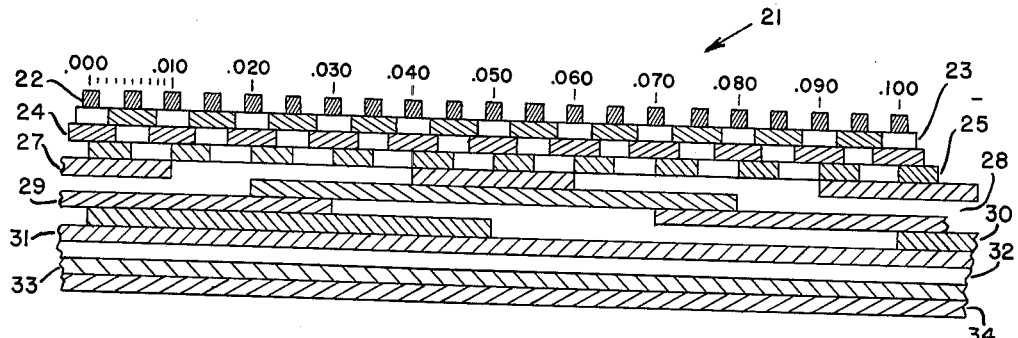
FIG. 5 is an enlarged developed view of an incremental portion of the code employed on the disc of FIG. 4.

If it is desired to provide a direct conversion from linear motion to rotary motion, and the wheel 18 makes one revolution for five inches of linear movement of saddle 13, it is necessary to provide a code of five thousand discrete positions about the code disc 21 in order to have it sensitive enough to indicate .001″ as the least significant digit. On the other hand, if the code disc 21 makes one revolution for ½″ of movement instead of 5″ of movement of saddle 13, it will be sensitive enough to indicate .0001″ as the least significant digit. Referring to FIGS. 4 and 5, in the embodiment disclosed, this has been accomplished by utilizing the four outermost zones or bands 22, 23, 24 and 25 on code disc 21 to indicate the least significant digit and representing .001″ increments of movement of the saddle 13. The outermost zone 22 is shown as including 40 alternating transparent and opaque blocks for .100″, or 400 such blocks for 1.0″, or 2,000 blocks for 5.0″. Accordingly, when the disc 21 makes one revolution, which it does when the saddle 13 moves through five inches, 2,000 alternating transparent and opaque blocks will pass a given fixed datum 26 in the housing 14. The zones 23, 24 and 25 are shown as including 20 alternating transparent and opaque blocks for .100″, or 200 such blocks for 1.0″, or 1,000 such blocks about the disc 21. These blocks are staggered relatively to each other as shown in FIG. 5 for a purpose to be described later. From the foregoing it is evident that within the zones 22, 23, 24 and 25, there are 5,000 alternating transparent and opaque blocks about the disc 21. Accordingly, the movement from one of these blocks to another past the datum 26 represents .001″ of travel of the saddle 13.

The zones 27, 28, 29 and 30 on disc 21 may be employed to represent the next least significant digit, which is the second place on the right of the decimal point and is ten times as large as the least significant digit. Accordingly, only 500 alternating transparent and opaque blocks are required within the zones 27, 28, 29 and 30. In zone 27 there are shown four alternating transparent and translucent blocks covering .100″, or 40 for 1.0″, or 200 about the disc 21 for 5.0″. In each of zones 28, 29 and 30 there are shown two alternating transparent and translucent blocks for .100″, or 20 for 1.0″, or 100 for 5.0″ about disc 21. From the foregoing it is evident that there are 500 alternating transparent and translucent blocks about disc 21 within the zones 27, 28, 29 and 30 so that as a movement of saddle 13 is made to cause a change from a transparent to a translucent block past datum 26, within zones 27, 28, 29 and 30, a movement of .010″ of saddle 13 will have occurred.

The zones 31, 32, 33 and 34 may be employed to represent the next least significant digit which is the first place to the right of the decimal point, and is one hundred times as large as the least significant digit and ten times as large as the next least significant digit. Accordingly, only 50 alternating transparent and translucent blocks are required within the zones 31, 32, 33 and 34. In zone 31, there is shown only 4/10 of a block for .100″, or four alternating blocks for 1.0″, or 20 alternating blocks for 5.0″ about the disc 21. In zones 32, 33 and 34 there is shown only 2/10 of a block for .100″, or two blocks for 1.0″, or 10 alternating transparent and translucent blocks about disc 21.

The specific dimensions of the alternating blocks for the embodiment disclosed are given in the following table:

| Zone | Block Width[1] | Space Width | Angle Block, degrees | Angle Space, degrees | No. Blocks | Mean Radius[2] | Full Block From "A", degrees |
|---|---|---|---|---|---|---|---|
| 1 | .0057 | .0087 | .144 | .216 | 1,000 | 2.30 | .2880 |
| 2 | .0167 | .0110 | .432 | .288 | 500 | 2.21 | .144 |
| 3 | .0160 | .0105 | .432 | .288 | 500 | 2.12 | .504 |
| 4 | .0128 | .0128 | .360 | .360 | 500 | 2.03 | .000 |
| 5 | .0487 | .0727 | 1.440 | 2.160 | 100 | 1.94 | 2.880 |
| 6 | .1387 | .0924 | 4.320 | 2.880 | 50 | 1.85 | 1.440 |
| 7 | .1319 | .0879 | 4.320 | 2.880 | 50 | 1.76 | 5.040 |
| 8 | .1044 | .1044 | 3.600 | 3.600 | 50 | 1.67 | 0.000 |
| 9 | .3945 | .5919 | 14.400 | 21.600 | 10 | 1.58 | 28.800 |
| 10 | 1.1159 | .7440 | 43.200 | 28.800 | 5 | 1.49 | 14.400 |
| 11 | 1.0481 | .6988 | 43.200 | 28.800 | 5 | 1.40 | 50.400 |
| 12 | .8168 | .8168 | 36.000 | 36.000 | 5 | 1.31 | 0.000 |

[1] Circular distance along mean radius.
[2] Distance to center of zone.

The staggered arrangement of the blocks on disc 21 is such that a code logic as set forth in the following table is provided for each significant digit.

| Digit | Zone | | | |
|---|---|---|---|---|
| 0 | 0 | 1 | 0 | 0 |
| 1 | 1 | 1 | 0 | 0 |
| 2 | 1 | 0 | 0 | 0 |
| 3 | 1 | 0 | 1 | 0 |
| 4 | 0 | 0 | 1 | 0 |
| 5 | 0 | 0 | 1 | 1 |
| 6 | 1 | 0 | 1 | 1 |
| 7 | 1 | 0 | 0 | 1 |
| 8 | 1 | 1 | 0 | 1 |
| 9 | 0 | 1 | 0 | 1 |

From the foregoing it is evident that there is provided a separate and distinct code of four numerals each for each digit from 0 to 9, inclusive, and that the numerals are either 0 or 1.

Figure 3:
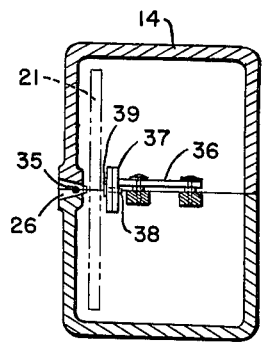
FIG. 3 is a sectional view taken substantially along line 3—3 of FIG. 2.

Referring to FIGS. 1, 2 and 3, the datum 26 may take the form of a recess within housing 14, terminating in a narrow slit opening into the inside of the housing 14. A narrow elongated source of light 35 may be provided within the recess 26 radially disposed relative to the code disc 21. A bracket 36 may be stationarily mounted within the housing 14 and it may include an arm 37 arranged in parallel relation relative to the slit of the recess 26 and on the side of disc 21 opposite that exposed to the source of light 35. Twelve light-sensitive cells 38, such as photo-electric cells, may be mounted in the arm 37 in a line parallel with the slit of recess 26, and radially spaced such that one is provided for each of the twelve zones 23, 24, 25 and 27 to 34, inclusive. An opaque plate 39 may be fixed to the arm 37, overlying the one ends of the twelve photo-electric cells 38, and a narrow transparent scratch may be formed on the plate 39 that is exactly parallel to the slit in recess 26 and located centrally of the ends of the twelve photo-electric cells 38. The construction and arrangement of the parts are such that the light from source 35 passes through the disc 21 and only that portion of the light passing through each of the twelve zones acts on its corresponding photo-electric cell 38.

Referring again to FIG. 5, it will be evident that with the saddle 13 at its central or zero position, only zones 23, 28 and 32 of the twelve zones will pass light from source 35 to the corresponding cells 38. All other zones will pass no light to their corresponding cells. Consequently, and according to the code logic, each of the three digits will be represented by the code 0–1–0–0 which is zero. When the saddle moves .001″ from its zero position, the cells 38 for zones 22 and 23 receive light, while the cells 38 for zones 24 and 25 receive no light. Consequently, the least significant digit (the third digit to the right of the decimal point) is 1–1–0–0, which according to the code logic is "1." The remaining zones are unchanged and read zero, as before. Thus, the digital representation is .001 which is the movement of the saddle 13.

From the foregoing it is evident that for each one-inch movement of the saddle 13, the disc 21 and wheel 18 will make ⅕ of a revolution. Accordingly, the code on disc 21 is complete within 72° of the disc 21 for one inch of saddle travel, and is repeated five times throughout the 360° of disc 21.

Figure 6:
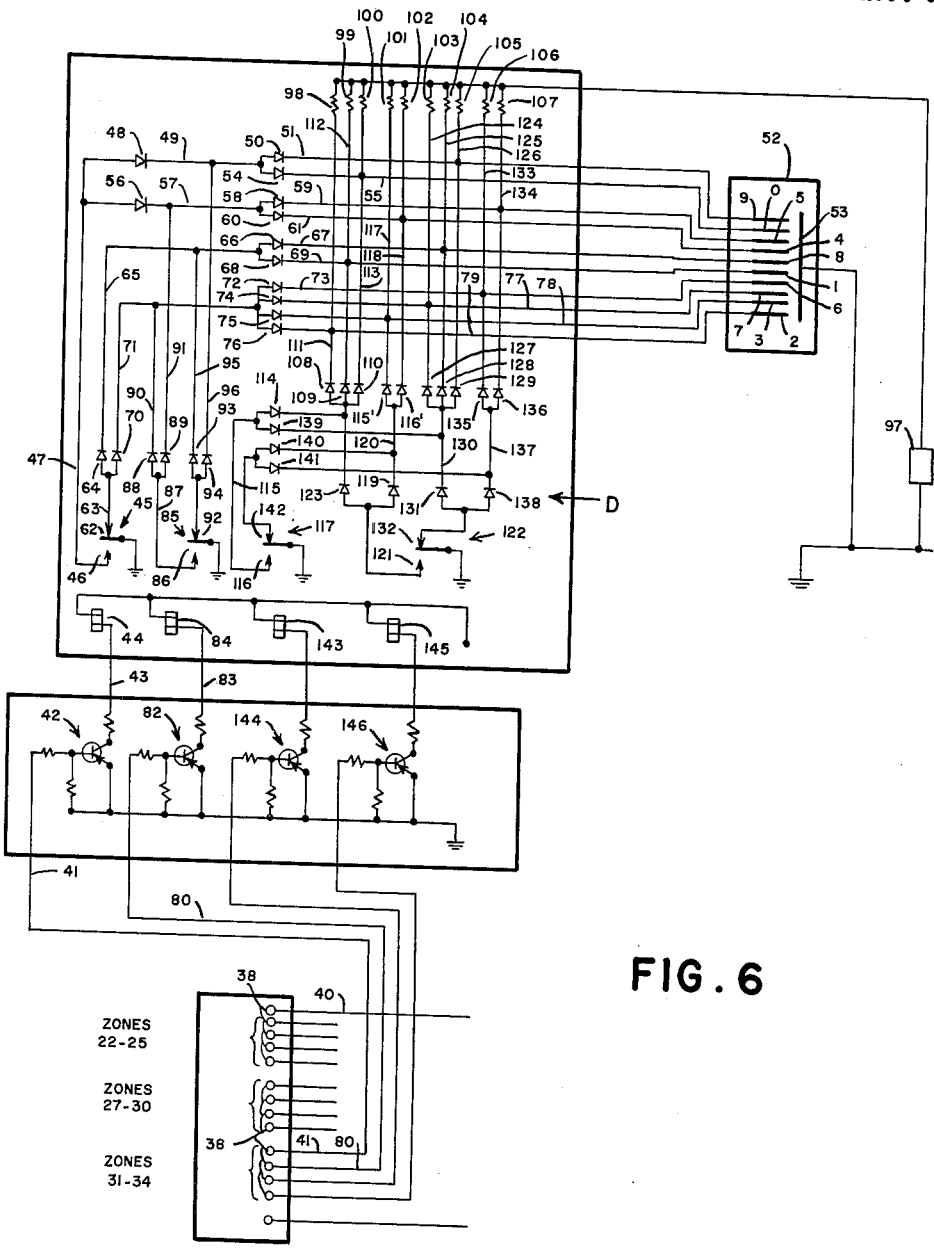
FIG. 6 is an electrical wiring diagram of certain of the circuitry employed with the invention.

Referring to FIG. 6, the cell block or arm 37 (also FIG. 3) supporting the cells 38 for all of the zones is shown as having a common input 40 that is connected to one terminal of each of the photo cells 38. The other terminal 41 for the cell 38 corresponding to the zone 31 is connected to an amplifier 42, thence to ground. The output 43 from amplifier 42 leads to a solenoid 44 of a sensitive relay 45, thence to a negative source of potential. The sensitive relay 45 forms part of a diode matrix D. The one side 46 of relay 45 is connected through a line 47 to a diode 48, thence through a line 49 to a diode 50. The output of diode 50 leads through a line 51 to a cathode base pin of an "Inditron" tube 52. The tube 52 has a common anode 53 and ten individual cathodes. Each cathode is a small wire shaped to represent one of the decimal digits "0" through "9." The tube 52 is a neon-filled device, and when a potential is placed between the common anode 53 and any one of the individual cathodes, it becomes visible as an orange neon glow in the form of the numeral shape of the particular cathode energized. In the embodiment disclosed, the line 51 is connected to the base pin for the cathode in tube 52 in the shape of the numeral "9."

Another diode 54 is connected to line 49 in parallel with diode 50, and its output is connected through a line 55 to the cathode of tube 52 that is in the shape of the numeral "0." Another diode 56 is connected to line 47 in parallel with diode 48. The output of diode 56 is connected through a line 57 to a diode 58. The output of diode 58 is connected through a line 59 to the cathode of tube 52 that is in the shape of the numeral "5." Another diode 60 is connected through a line 61 to the cathode of tube 52 that is in the form of the numeral "4."

The other side 62 of relay 45 is connected through a line 63 to a diode 64, the output of which is connected through a line 65 to another diode 66. The output of diode 66 is connected through a line 67 to the cathode of tube 52 that is in the form of the numeral "8." Another diode 68 is connected to line 65 in parallel with diode 66, and it is connected through a line 69 to the cathode of tube 52 that is in the form of the numeral "1."

A diode 70 is connected to line 63 in parallel with diode 64, and it is connected through a line 71 to a diode 72. The output of diode 72 is connected through a line 73 to the cathode of tube 52 in the form of the numeral "6." Three other diodes 74, 75 and 76 are also connected to line 71 in parallel with diode 72, and their outputs, respectively, are connected through lines 77, 78 and 79 to the cathodes of tube 52 that are in the form of the numerals "7," "3" and "2," respectively.

The photo cell 38 for the zone 32 of disc 21 is connected through a line 80 to an amplifier 82. The output of amplifier 82 is connected through a line 83 to a solenoid 84 of a sensitive relay 85. The one side 86 of relay 85 is connected through a line 87 to two diodes 88 and 89 in parallel, which latter are connected through lines 90 and 91 to lines 71 and 57, respectively. The other side 92 of relay 85 is connected to two diodes 93 and 94 in parallel, which latter are connected through lines 95 and 96 to lines 65 and 49, respectively.

Power from a source 97 is adapted to supply a voltage to resistors 98 to 107, inclusive, arranged in parallel relation. The resistors 98, 99 and 100 are, respectively, connected to lines 79, 69 and 55, as well as to diodes 108, 109 and 110, respectively, through lines 111, 112 and 113. The latter diodes are connected in parallel relation to each other and all three are connected in series with a diode 114 that is connected through a line 115 to the one contact 116 of a sensitive relay 117.

The resistors 101 and 102 are connected, respectively, to lines 78 and 61, as well as to diodes 115′ and 116′ through lines 117 and 118. Diodes 115′ and 116′ are connected to a diode 119 through a line 120. The diode 119 is connected to the one side 121 of a sensitive relay 122. The diodes 108, 109 and 110 are not only connected to diode 114, but also to a diode 123 which latter is also connected to the side 121 of relay 122.

Resistors 103, 104 and 105 are connected, respectively, to lines 77, 67 and 51 through lines 124, 125 and 126. These latter line lead to diodes 127, 128 and 129, respectively, and a common output 130 therefrom leads to a diode 131 which latter is connected to the side 132 of relay 122. Resistors 106 and 107 are connected through lines 133 and 134 to lines 73 and 59, respectively, as well as to diodes 135 and 136. Diodes 135 and 136 are connected through a line 137 to a diode 138 which latter also is connected to the side 132 of relay 122.

The line 130 is connected to a diode 139 that is connected to line 115. Lines 120 and 137 are connected, respectively, to diodes 140 and 141, which latter also are connected to a side 142 of the relay 117.

The relay 117 is adapted to be operated by a solenoid 143 that is controlled by an amplifier 144, the latter being responsive to signals from the photo cell 38 for the zone 33 of disc 21. The relay 122 is adapted to be operated by a solenoid 145, the latter being operated by an amplifier 146 responsive to signals from the photo cell 38 for zone 34 of disc 21.

Referring to the diode matrix D, it is evident that all of the diodes will permit current to flow from negative to positive but not from positive to negative. Furthermore, from the logic diagram, decimal digit "0" is represented by "0–1–0–0." This means that zone number 32 passes light to its photo cell 38, and zones 31, 33 and 34 do not pass light. Accordingly, only solenoid 84 is energized, and solenoids 44, 143 and 145 are de-energized. Therefore, the movable contacts of relays 45, 117 and 122 engage contacts 62, 142 and 132, respectively; and the movable contact of relay 85 engages contact 86. Thus it will be evident that resistor 98 is grounded through lines 111, 79, 71, 63 and contact 62 of relay 45. If the circuit for each resistor 99, 101, 102, 103, 104, 105, 106 and 107 is traced, it will be found that each will be at ground potential. However tracing the circuit including resistor 100 results in no ground; therefore, all points connected to it will be at a negative potential. Thus, since line 55 is in this circuit and it is connected to the cathode of tube 52 that is in the form of the numeral "0" such number becomes visible. Since all other cathodes of tube 52 are at ground potential, only the "0" appears in tube 52.

The following table lists the order of relay energization to render the numerals "0" to "9" visible in tube 52:

| Digit: | Relay |
|---|---|
| 0 | 85 |
| 1 | 45 and 85 |
| 2 | 45 |
| 3 | 45 and 117 |
| 4 | 117 |
| 5 | 117 and 122 |
| 6 | 45, 117 and 122 |
| 7 | 45 and 122 |
| 8 | 45, 85 and 122 |
| 9 | 85 and 122 |

There is a tube 52 for the zones 27, 28, 29 and 30, and it is connected to the photo cells 38 for these zones through a diode matrix, relays and amplifiers in the same way that the tube 52 is connected to the cells 38 for the zones 31, 32, 33 and 34. This tube 52, therefore, represents numerical digits "0" to "9" for the next least significant digit.

There is also a tube 52 for the zones 22, 23, 24 and 25, and it is connected to the photo cells 38 for these zones through a diode matrix, relays and amplifiers in the same way that the tubes 52 are connected to the cells 38 for the other eight zones.

These three "Inditron" tubes 52 will then represent the three positions to the right of the decimal place. It will be recalled that the pattern on the code disc 21 repeats itself exactly five times in one revolution, and one such revolution is occasioned by five inches of movement of the saddle 13. Furthermore, it will be recalled that there are 5,000 discrete positions possible with the code disc 21 making one revolution. Accordingly, for each inch of movement of the saddle 13 from its zero position, the three tubes 52 will start from 000, indicate 999 digits and return to 000, with disc 21 making ⅕ of a revolution.

Figure 7:
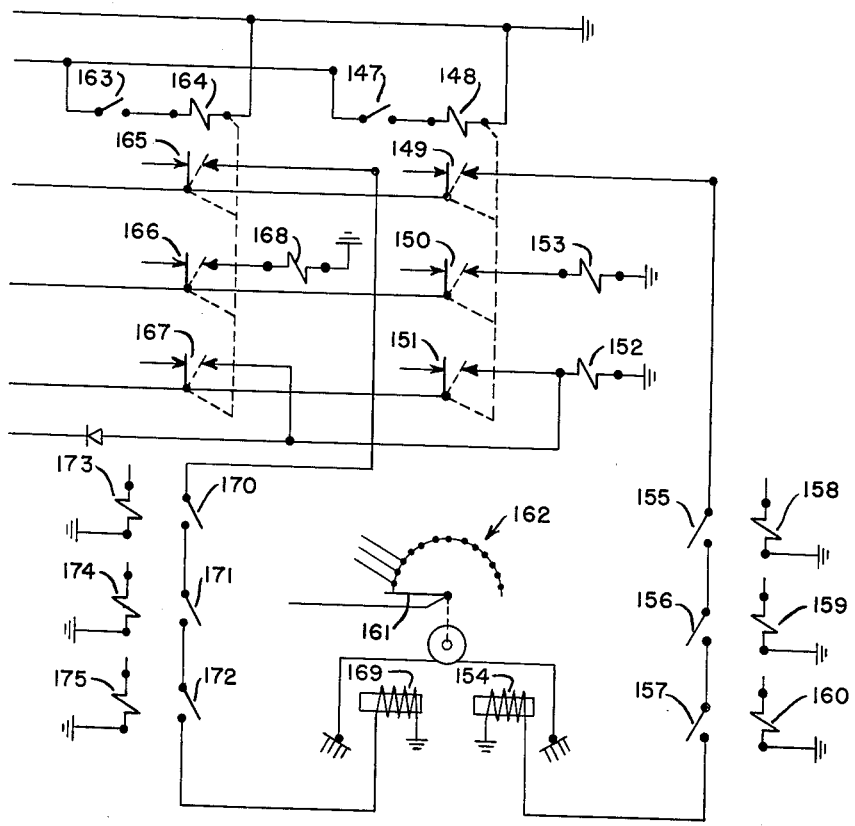
FIG. 7 is an electrical wiring diagram of certain other circuitry employed with the invention.

Referring to FIG. 7, a manually operable switch 147 is disclosed which, when closed, energizes a solenoid 148. Energizing solenoid 148 moves contacts 149, 150 and 151 from their solid to their dotted line positions. Contact 151 in its dotted line position energizes a solenoid 152, causing a binder (not shown) for saddle 13 to be released. Contact 150 in its dotted line position energizes a solenoid 153 which actuates means (not shown) for causing saddle 13 to move to the right.

With contact 149 in its dotted line position, a solenoid 154 is energized only if three series arranged switches 155, 156 and 157 are simultaneously closed. The switches 155, 156 and 157 are operated by solenoids 158, 159 and 160. Solenoid 158 is connected to the "0" cathode base pin of the tube 52 for the zones 22, 23, 24 and 25; the solenoid 159 is connected to the "0" cathode base pin of the tube 52 for the zones 27, 28, 29 and 30; and the solenoid 160 is connected to the "0" cathode base pin of the tube 52 for the zones 31, 32, 33 and 34.

Each energization of solenoid 154 is adapted to index the arm 161 of a stepping switch 162 one position in a clockwise direction. The contacts of stepping switch 162 may be connected successively to the cathodes of an "Inditron" tube having any desired number of cathodes. Accordingly, each time the three tubes 52 pass from the three digits "999" to "000," all three switches 155, 156 and 157 are simultaneously closed, thereby causing arm 161 to index to the next succeeding contact of stepping switch 162. The "Inditron" tube controlled by stepping switch 162 may be employed to indicate the digits to the left of the decimal point.

There may also be a manually operable switch 163 in the circuit of FIG. 7, which when closed energizes a solenoid 164. Energizing solenoid 164 moves contacts 165, 166 and 167 from their solid line positions to their dotted line positions. With contact 167 in its dotted line position, solenoid 152 is energized, thereby releasing the binder for saddle 13. With contact 166 in its dotted line position, a solenoid 168 is energized, thereby actuating means (not shown) for moving saddle 13 leftwardly. With contact 165 in its dotted line position, a solenoid 169 is energized, provided series arranged switches 170, 171 and 172 are simultaneously closed. Switches 170, 171 and 172 are actuated by the energization of soleoids 173, 174 and 175. The solenoid 173 is connected to the base pin of the cathode of tube 52 that is controlled by zones 22, 23, 24 and 25, and which is in the form of the numeral "9." The solenoid 174 is connected to the base pin of the cathode of tube 52 that is controlled by zones 27, 28, and 29 and 30, and which is the form of the numeral "9." The solenoid 175 is connected to the base pin of the cathode of tube 52 that is controlled by zones 31, 32, 33 and 34, and which also is in the form of the numeral "9."

Energizing solenoid 169 causes the arm 161 of stepping switch 162 to be indexed to its next succeeding position in a counterclockwise direction. From the foregoing it is evident that the three switches 170, 171 and 172 will simultaneously be closed only when the saddle 13 is moving leftwardly and the numeral "9" of each of the three tubes 52 is illuminated.

From the foregoing it is evident that the coincidence circuit shown in FIG. 7 will always function in a manner to increase the indication of saddle movement as it moves rightwardly, and to decrease the indication of saddle movement as it moves leftwardly. Of course, a similar converting and coincidence circuit may be employed for movement of the cross rail 10 at right angles to the movement of saddle 13.

Although the various features of the new and improved analog to digital system have been shown and described in detail to fully disclose one embodiment of the invention, it will be evident that changes may be made in such details and certain features may be used without others without departing from the principles of the invention.

What is claimed is:

1. In an apparatus for determining, decimally, positions in space of a linearly movable member adapted to be moved in either direction along a path of motion, a coded member for representing decimal places of the motion of said member; means responsive to the movement of said member for moving said coded member past a source of light; a plurality of light-sensitive means adapted to be subjected to light from said source passing through said coded member; separate converting means including output circuits for each digit on the righthand side of the decimal point; means for connecting each of said light-sensitive means to its corresponding converting means, for converting said coded information into a decimal system; and means responsive to the energization of certain different discrete combinations of said output circuits, depending upon the direction of movement of said coded member for successively energizing other means.

2. In an apparatus for determining, decimally, positions in space of a linearly movable member adapted to be moved in either direction along a path of motion, a coded member for representing decimal places of the motion of said member; a substantially inertialess rotatable wheel mounted on said movable member and frictionally engaging a flat surface parallel with the path of motion of said member; a coded disc fixed to said wheel; a light source past which the code on said disc passes in response to movement of said member; a plurality of light-sensitive means adapted to be subjected to light from said source passing through said coded member; separate converting means including output circuits for each digit on the righthand side of the decimal point; means for connecting each of said light-sensitive means to its corresponding converting means, for converting said coded information into a decimal system; and means responsive to the energization of certain different discrete combinations of said output circuits, depending upon the direction of movement of said coded member for successively energizing other means.

3. In an apparatus for determining, decimally, positions in space of a linearly movable member adapted to be moved in either direction along a path of motion, a coded member for representing decimal places of the motion of said member; means responsive to the movement of said member for moving said coded member past a source of light, a plurality of light-sensitive means adapted to be subjected to light from said source passing through said coded member, separate converting means including output circuits for each digit on the righthand side of the decimal point; amplifying means for connecting each of said light-sensitive means to its corresponding converting means, for converting said coded information into a decimal system; and means responsive to the energization of certain different discrete combinations of said output circuits, depending upon the direction of movement of said coded member for successively energizing other means.

4. In an apparatus for determining, decimally, positions in space of a linearly movable member adapted to be moved in either direction along a path of motion, a coded member for representing decimal places of the motion of said member; means responsive to the movement of said member for moving said coded member past a source of light; a plurality of light-sensitive means adapted to be subjected to light from said source passing through said coded member; separate converting means including output circuits for each digit on the righthand side of the decimal point; means for connecting each of said light-sensitive means to its corresponding converting means, for converting said coded information into a decimal system; and means responsive to the energization of certain different discrete combinations of said output circuits, depending upon the direction of movement of said coded member for successively energizing digit indicating means for representing digits on the left side of the decimal point.

5. In an apparatus for determining, decimally, positions in space of a linearly movable member adapted to be moved in either direction along a path of motion, a coded member having plural groups of plural zones each thereon, each group representing a significant decimal place; means responsive to the movement of said member for moving said coded member in proportion to the movement of said member; separate light-sensitive means for each of said zones; separate converting means for each group of zones; means connecting the light-sensitive means within each group to its corresponding converting means, for converting said coded information into a decimal system; and means responsive to the energization of certain different discrete combinations of the output circuits of said converting means, depending upon the direction of movement of said coded member for successively energizing other means.

6. In an apparatus for determining, decimally, positions in space of a linearly movable member adapted to be moved in either direction along a path of motion, a coded member having plural groups of plural zones each thereon, each group representing a significant decimal place; means responsive to the movement of said member for moving said coded member in proportion to the movement of said member; separate light-sensitive means for each of said zones; separate converting means for each group of zones; means connecting the light-sensitive means within each group to its corresponding converting means, for converting said coded information into a decimal system; means operated by said converting means for indicating said converted coded information as a decimal; and means responsive to the energization of certain different discrete combinations of the output circuits of said converting means, depending upon the direction of movement of said coded member for successively energizing digit indicating means for representing digits on the left side of the decimal point.

7. In an apparatus for determining, decimally, positions in space of a linearly movable member adapted to be moved in either direction along a path of motion, a code disc having plural groups of plural zones each thereon, each group representing a significant decimal place; means responsive to the movement of said member for rotating said code disc; separate light-sensitive means for each of said zones; separate diode matrix converting means including ten output circuits for each group of zones; means connecting the light-sensitive means within each group to its corresponding converting means, for converting said coded information into a decimal system; and means responsive to the energization of certain different discrete combinations of said output circuits, depending upon the direction of rotation of said code disc for successively energizing other means.

8. In an apparatus for determining, decimally, positions in space of a linearly movable member adapted to be moved in either direction along a path of motion, a code disc having plural groups of plural zones each thereon, each group representing a significant decimal place; means responsive to the movement of said member for rotating said code disc; separate light-sensitive means for each of said zones; separate diode matrix converting means including ten output circuits for each group of zones; means connecting the light-sensitive means within each group to its corresponding converting means, for converting said coded information into a decimal system; means operated by said diode matrix means for indicating said decimal information; and means responsive to the energization of certain different discrete combinations of said output circuits, depending upon the direction of rotation of said code disc for successively energizing digit indicating means for representing digits on the left side of the decimal point.

9. In an apparatus for determining, decimally, positions in space of a linearly movable member adapted to be moved in either direction along a path of motion, a code disc having plural groups of plural zones each thereon, each group representing a significant decimal place; means responsive to the movement of said member for rotating said code disc; separate light-sensitive means for each of said zones; separate converting means including ten output circuits for each group of zones; means connecting the light-sensitive means within each group to its corresponding converting means, for converting said coded information into a decimal system; digit indicating means for representing digits on the left side of the decimal point; a bi-directional stepping switch for operating said digit indicating means; and means responsive to the energization of certain different discrete combinations of said output circuits, depending upon the direction of rotation of said code disc for successively energizing said bi-directional stepping switch.

10. Apparatus comprising in combination, a linearly movable member adapted to be moved in either direction along a path of motion; a housing attached to said linearly movable member; a coded disc mounted for free rotation within said housing; a wheel fixed to and rotatable with said disc and frictionally engaging a straight stationary member parallel with the path of motion of said linearly movable member; a source of light within said housing, past which the code on said disc moves when said disc is rotated; a plurality of light-sensitive means adapted to be subjected to light from said source passing through said coded member; separate converting means including output circuits; means for connecting each of said light-sensitive means to its corresponding converting means; and means responsive to the energization of certain different discrete combinations of said output circuits, depending upon the direction of movement of said coded member for successively energizing other means.

11. Apparatus comprising in combination, a linearly movable member adapted to be moved in either direction along a path of motion; a coded member having plural groups of plural zones each thereon, each group representing a significant decimal place; means responsive to the movement of said linearly movable member for moving said coded member past a source of light; a plurality of light-sensitive means adapted to be subjected to light from said source passing through said coded member; separate converting means including output circuits; means for connecting each of said light-sensitive means to its corresponding converting means; and means responsive to the energization of certain different discrete combinations of said output circuits, depending upon the direction of movement of said coded member for successively energizing other means.

12. Apparatus comprising in combination, a linearly movable member adapted to be moved in either direction along a path of motion; a housing attached to said linearly movable member; a coded disc mounted for free rotation within said housing, said disc having plural groups of plural zones each thereon, each group representing a significant decimal place; a wheel fixed to and rotatable with said disc and frictionally engaging a straight stationary member parallel with the path of motion of said linearly movable member; a source of light within said housing, past which the code on said disc moves when said disc is rotated; a plurality of light-sensitive means adapted to be subjected to light from said source passing through said coded member; separate converting means including output circuits; means for connecting each of said light-sensitive means to its corresponding converting means; and means responsive to the energization of certain different discrete combinations of said output circuits, depending upon the direction of movement of said coded member for successively energizing other means.

References Cited by the Examiner
UNITED STATES PATENTS

| | | | |
|---|---|---|---|
| 2,775,020 | 7/1956 | Belcher | 340—347 |
| 2,826,252 | 3/1958 | Dickstein | 340—347 |
| 2,855,585 | 10/1958 | Quinby | 340—347 |
| 2,907,997 | 10/1959 | Corwin | 340—347 |

MALCOLM A. MORRISON, *Primary Examiner.*

IRVING L. SRAGOW, *Examiner.*